(12) United States Patent
Segawa (10) Patent No.: US 6,597,677 B1
(45) Date of Patent: Jul. 22, 2003

(54) SPREADING CODE ALLOCATION METHOD AND SYSTEM

(75) Inventor: Kazuhiro Segawa, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/354,162

(22) Filed: Jul. 16, 1999

(30) Foreign Application Priority Data

Jul. 16, 1998 (JP) .......................................... 10-201503

(51) Int. Cl.⁷ ............................................... H04B 7/216
(52) U.S. Cl. ........................ 370/342; 370/329; 370/335
(58) Field of Search ................................ 370/342, 329, 370/335, 337, 441, 437, 465, 468, 491; 455/446, 186.1, 447, 448, 442, 561, 456; 375/206, 200, 140, 137, 130, 149, 145

(56) References Cited

U.S. PATENT DOCUMENTS

| | | | | | |
|---|---|---|---|---|---|
| 5,438,596 A | * | 8/1995 | Sugita | ........................ | 375/200 |
| 5,914,947 A | * | 6/1999 | Saito | ........................ | 370/337 |
| 5,953,326 A | * | 9/1999 | Nakamura et al. | ........... | 370/335 |
| 6,049,564 A | * | 4/2000 | Chang | ........................ | 375/206 |
| 6,058,136 A | * | 5/2000 | Ganesh et al. | ............... | 375/200 |
| 6,070,078 A | * | 5/2000 | Camp et al. | ................. | 455/456 |
| 6,128,288 A | * | 10/2000 | Miya | ........................ | 370/335 |
| 6,272,122 B1 | * | 8/2001 | Wee | .......................... | 370/342 |
| 6,359,874 B1 | * | 3/2002 | Dent | .......................... | 370/342 |

FOREIGN PATENT DOCUMENTS

| | | | | |
|---|---|---|---|---|
| JP | 9-181647 | 7/1997 | ........... | H04B/1/707 |
| JP | 10-56405 | 2/1998 | ........... | H04B/1/707 |

* cited by examiner

Primary Examiner—Thanh Cong Le
Assistant Examiner—C. Chow
(74) Attorney, Agent, or Firm—Sughrue Mion, PLLC

(57) ABSTRACT

A method for allocating a plurality of spreading codes to a plurality of base stations is disclosed. After retrievably storing distances between each of the base stations and other base stations in a memory, the memory is searched for a longest distance of the distances. Based on a necessary spreading code difference and a longest spreading code shift corresponding to the longest distance, a spreading code spacing between spreading codes to be allocated to the base stations is determined. Then, spreading codes with the spreading code spacing are sequentially allocated to the base stations.

15 Claims, 6 Drawing Sheets

| | BTS40$_1$ | BTS40$_2$ | | BTS40$_{N-1}$ | BTS40$_N$ |
|---|---|---|---|---|---|
| BTS40$_1$ | | "3" | | "4" | "15" |
| BTS40$_2$ | "3" | | | "6" | "7" |
| | | | | | |
| BTS40$_{N-1}$ | "5" | "6" | | | "9" |
| BTS40$_N$ | "15" | "7" | | "9" | |

DATABASE 59

SPREADING CODE ALLOCATION METHOD AND SYSTEM

BACKGROUND OF THE INVENTION

1. Field of the Invention

The present invention relates to a spreading code allocation system and method, and in particular to a spreading code allocation system and method, for allocating uniquely spreading codes to base transceiver stations.

2. Description of the Related Art

In a mobile communications system and a licensed personal communication service (PCS) system, an access scheme capable of accommodating as many users as possible In a limited frequency band has been desired. As such an access scheme, there is a frequency division multiple access (heretofore referred to as FDMA) scheme, in which frequency division is conducted so as to allow common use of the frequency band by a plurality of users. There is also a time division multiple access (hereafter referred to as TDMA) scheme, in which division into periodic time slots is conducted.

In addition, the code division multiple access (hereafter referred to as CDMA) scheme capable of having more user channels than the FDMA and TDMA schemes has been standardized by TIA (Telecommunication Industry Association) and EIA (Electronic Industries Association). In the CDMA scheme, the spectrum of a transmission frequency is widened by using a spreading code uniquely allocated to a user to be identified. As a result, a plurality of users can share the same frequency band. At the time of reception, demodulation is conducted by using the same spreading code as used at the time of transmission. Since signals from other users remain to have wide bands, it is possible to easily obtain a received signal which is addressed to its own station and is improved in signal-to-interference power ratio by a spreading gain. Typically as the spreading code, a pseudo-noise (hereafter abbreviated to PN) code functioning as a cyclic code has been used.

PN codes are uniquely allocated to a plurality of users using the same frequency band. Therefore, compared with the FDMA and TDMA schemes, a larger number of users can be accommodated per a predetermined bandwidth. Furthermore, since the transmission frequency band is wide, the frequency selectivity is strong. Therefore, the CDMA scheme provides concealment of information because demodulation cannot be conducted without using the same PN code as that used at the time of transmission.

When adopting the CDMA scheme, for example, in a mobile communications system of a cellular scheme, besides a spreading code allocated to a mobile station, another spreading code Is allocated to the mobile station in some cases. In the mobile communication system of the cellular scheme, there are pluralities of base transceiver stations, and consequently the mobile station needs to identify a base transceiver station with which the mobile station is communicating. Especially near the boundary of an area in which each base transceiver station provides service, It is necessary to change the base transceiver station providing service whenever the mobile station moves from a service area to another service area. In order to identify such a base transceiver station, the different spreading code is needed.

Figure 1:
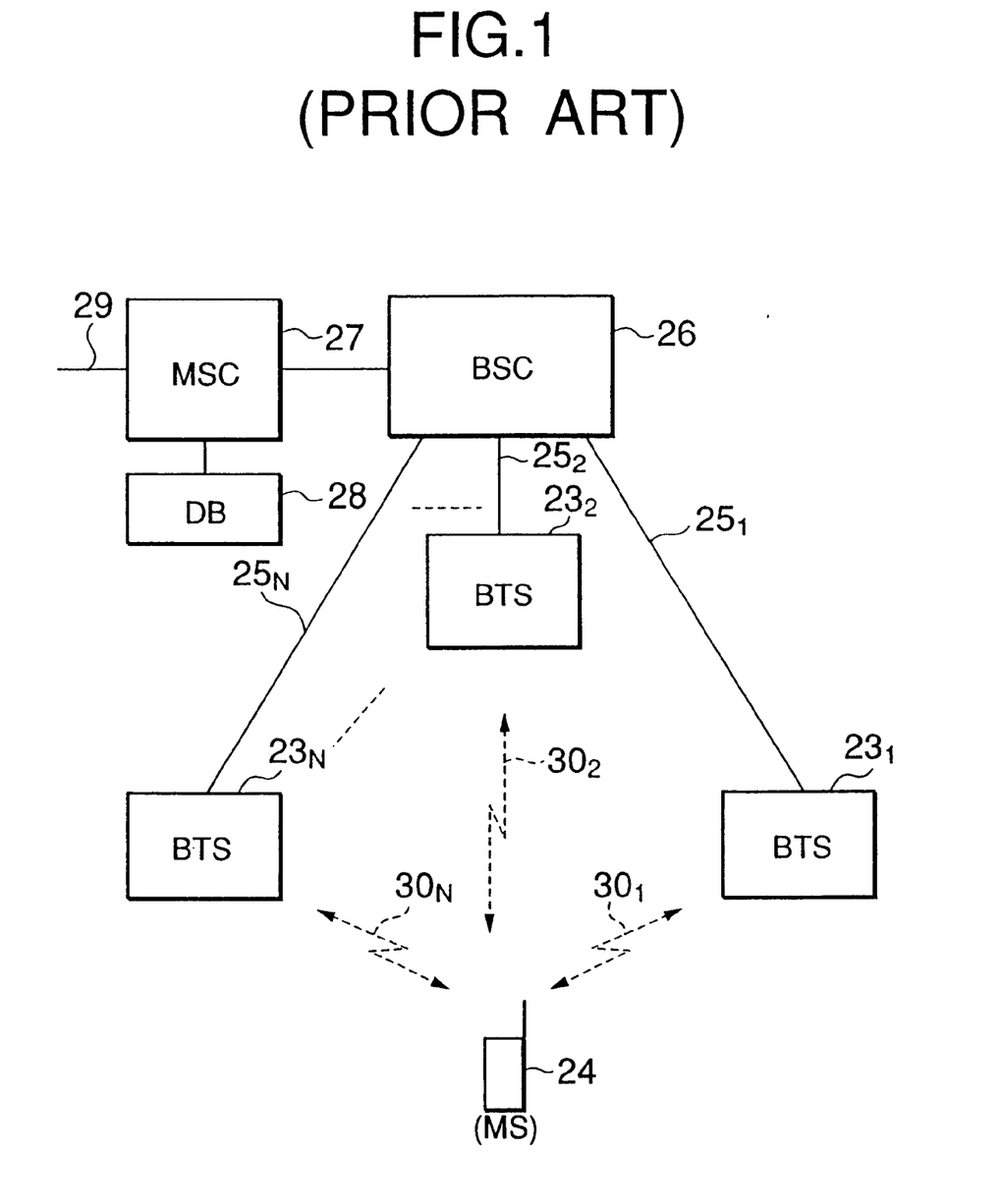
FIG. 1 is a schematic diagram showing the configuration of a conventional mobile communications system.

As shown in FIG. 1, consider a mobile communications system including a plurality of base transceiver stations each Identified by a different spreading code. Each of the base transceiver stations (hereafter referred to as BTSs) $23_1$, $23_2, \ldots, 23_N$ provides communication services to a mobile station (hereafter referred to as MS) 24 located within its service area. The first to Nth BTSs $23_1$ through $23_N$ are connected to a base transceiver station controller (hereafter referred to as BSC) 26 via transmission paths $25_1$ through $25_N$, respectively. The BSC 26 is connected to a mobile switching center (hereafter referred to as MSC) 27. The MSC 27 has a data base 28 associated therewith. The MSC 27 is connected to a public network (not shown) via a public line 29. The MS 24 can communicate with the first through Nth BTSs $23_1$ through $23_N$ by radio signals $30_1$ through $30_N$, respectively. A radio signal may convey incoming call information to the MS 24, outgoing call information from the MS 24 to a terminal of the opposite party, or communication information.

Each of the 1st through Nth BTSs $23_1$ through $23_N$ has a unique PN code allocated thereto as a spreading code. In the DB 28, PN codes allocated to the respective BTSs are stored in advance. The MSC 27 notifies the respective BTSs of corresponding PN codes via the BSC 26 and the transmission paths $25_1$ through $25_N$.

The MSC 27 performs call processing between the terminal of the opposite party and the MS 24 managed by the MSC 27. The BSC 26 monitors the BTSs including one communicating with the MS 24 at any time and changes the BTS communicating with the MS 24 to an adjacent BTS depending on movement of the MS 24. When an incoming call addressed to the MS 24 has occurred, the MSC 27 conducts call processing for the BTS serving an area in which the MS 24 exists.

Each BTS periodically sends a pilot PN code of its own BTS, called "pilot channel", to MSs existing in the service area served by the BTS, and transmits information for synchronization acquisition and holding, and clock recovery in each MS. Each MS responds to a BTS sending a pilot channel which is the largest in received intensity. As a result, each BTS can determine whether a MS under search is present in its own service area or not, and notifies the BSC of its result.

For example, it s now assumed that an incoming call to the MS 24 existing in an area served by the Nth BTS $23_N$ has occurred. Since the MS 24 has been recognized to be located within the service area of the Nth BTS $23_N$ by responding to a pilot channel from the Nth BTS $23_N$, the MSC 27 conducts call setup processing with the MS 24 via the BSC 26 and the Nth BTS $23_N$. At this time, the MS 24 can recognize from the PN code of the Nth BTS $23_N$ received over the above pilot channel that the call setup is caused by the Nth BTS $23_N$. In other words, the MS 24 selects and receives only the radio wave from the Nth BTS $23_N$ without being affected by radio waves from the first through (N−1)th BTSs $23_1$ through $23_{N-1}$. If the MS 24 has moved into an area served by the third BTS $23_3$, then the movement is periodically monitored by the BSC 26 as a result of MS 24 responding to a pilot channel sent from each BTS. Thereafter, communicating with the MS 24 is performed via the third BTS $23_3$.

As for the synchronization between the BTSs and MSs using PN codes as described above, the time required for the synchronization becomes longer according to the code length of the PN code. To improve the error rate and shorten the time required for synchronization, there has been proposed a technique for generating a PN code such that the code length thereof varies depending on an error rate detected by the BTS in Japanese Patent Application Lad-Open. No 9-181647.

Another technique for shortening the time for synchronization acquisition and the time required for synchronization establishment has been disclosed in Japanese Patent Application Laid-Open No. 10-56405. More specifically, the time for synchronization acquisition is shortened by reducing the length of a PN code for synchronization used in a pilot channel dedicated for initial synchronization acquisition between a MS and a BTS. The time required for synchronization establishment of the MS with the communication channel transmitted by the BTS is shortened by a phase of an identification code contained in an identification pilot channel agreeing with a phase of an identification PN code contained in a communication channel.

In the case where the FDMA or TDMA scheme is adopted in the mobile communcations system or the licensed PCS system, a limited frequency band is shared by a plurality of users and therefor the frequency allocation to the users is needed. In the system design stage, this frequency allocation is a work greatly influencing the communication quality. If it is attempted to accommodate more users or subscribers in the communications system adopting the FDMA scheme or the TDMA scheme, then it is necessary to divide the limited frequency band as efficiently as possible and to increase the number of BTSs. The increased number of BTSs causes the distance between BTSs to become shorter and the reuse, meaning the repetitive use of the same frequency band, becomes more frequent in the limited frequency band. Therefore, the distance between BTSs using the same frequency band becomes shorter. The larger the number of installed BTSs, the more difficult the frequency allocation to BTSs. In this way, frequency allocation involves a great amount of work.

In the case where the CDMA scheme is adopted, it is necessary to allocate PN codes to respective BTSs in the same way as the frequency allocation in the FDMA scheme or the TDMA scheme. In the conventional mobile communications system shown In FIG. 7, PN codes are manually stored in the DB 28 to allocate them to the BTSs, respectively and the respective BTSs are notified of the PN codes via transmission paths. In the CDMA scheme as well, work of allocating PN codes is needed in the same way as the frequency band allocation in the FDMA scheme or the TDMA scheme. If two different PN codes but close to each other are allocated to adjacent or neighboring BTSs, then there may be a possibility that the PN codes are erroneously detected due to delayed waves generated by multipath caused by configuration of the ground, natural features, and buildings. Therefore, It is necessary to allocate PN codes having a sufficient distance between them to BTSs adjacent to or close to each other.

In the case where it is attempted to accommodate more subscriber users in a communications system adopting the CDMA scheme, more BTSs are installed. Whenever a new BTS is installed, the work of allocating PN codes is needed. For example, in the case where one BTS is newly installed and a PN code is allocated thereto, PN codes which have had a sufficient distance between them, and PN codes must be allocated to all BTSs from the beginning all over again. In this way, the PN code allocation has a problem that it causes a great deal of work.

SUMMARY OF THE INVENTION

An object of the present invention is to provide a spreading code allocation method and system which dramatically reduces the amount of work for allocating spreading codes to base stations.

Another object of the present invention is to provide a spreading code allocation method and system which can allocate optimum spreading codes to base stations.

According to the present invention, a method for allocating a plurality of spreading codes to a plurality of base stations is provided. After retrievably storing distances between each of the base stations and other base stations in a memory, the memory is searched for a longest distance of the distances. Based on a necessary spreading code difference and a longest spreading code shift corresponding to the longest distance, a spreading code spacing between spreading codes to be allocated to the base stations is determined. Then spreading codes with the spreading code spacing are sequentially allocated to the base stations.

Preferably, the spreading code spacing determined as follows: comparing the necessary spreading code difference with the longest spreading code shift; and selecting a greater one of the necessary spreading code difference and the longest spreading code shift as the spreading code spacing. Further, the necessary spreading code difference may be obtained by dividing a number of available spreading codes by a number of the base stations.

It is preferable that the spreading codes with the spreading code spacing are allocated to the base stations such that two spreading codes with a smaller spacing are allocated respectively to two base stations which are located at a longer distant from each other.

The spreading code allocation may be performed by the following steps: d-1) selecting a certain base station and a certain spreading code which is allocated to the certain base station; d-2) selecting a base station located at a longest distance from a previously selected base station, excepting a further previously selected base station; d-3) allocating a spreading code to a currently selected base station, wherein a currently allocated spreading code is shifted from a previously allocated spreading code by the spreading code spacing; and d-4) repeating the steps d-2) and d-3) until the spreading codes have been allocated to all the base stations.

According to another aspect of the present invention, in a system for allocating a plurality of spreading codes to of: A plurality of base stations which are connected to a system controller, each of the base stations includes: a test transceiver for transmitting and receiving a predetermined spreading code on a pilot channel to and from other base stations under control of the system controller; a detector for detecting a spreading code shift from the predetermined spreading code received from each of the other base stations; and a transmitter for transmitting the spreading code shift to the system controller. The system controller includes: a database for retrievably storing spreading code shifts received from the base stations; a selector for searching the database for a longest spreading code shift; and an allocation controller for determining a spreading code spacing between spreading codes to be allocated to the base stations based on a necessary spreading code difference and the longest spreading code shift, and for sequentially allocating spreading codes with the spreading code spacing to the base stations.

As described above, according to the present invention, among the distances between a plurality of base stations, a maximum distance is selected and the spacing code spacing is determined based on the maximum distance. Spreading codes are allocated to the base stations with the spreading code spacing.

Therefore, it becomes possible to eliminate the need of manual work of allocating the spreading codes to the base stations in a CDMA system. In addition, it is possible to prevent degradation of the system quality caused by artificial allocation errors which could not be avoided in the manual allocation work.

Further, the spreading codes with the spreading code spacing are allocated to the base stations such that two spreading codes with a smaller spacing are allocated respectively to two base stations which are located at a longer distant from each other. Therefore, optimum allocation of the spreading codes can be achieved, and multiple paths between adjacent base transceiver stations can be eliminated, resulting in improved communication reliability.

In the case where the number of base stations is small, the available spreading code spacing might be greater than the necessary spreading code difference. In such a case, greater allocation spacing can be adopted. In other words, spreading codes separated by at least the necessary spreading code difference are allocated to the base stations. To a base station located farthest from a certain base station, a spreading code nearest to that of the certain base transceiver station is allocated. Therefore, a spreading code having a greater spacing can be allocated to a base station nearer the certain base station. As a result, the possibility of erroneous detection of spreading codes in each base transceiver station can be further lowered. Thus, a communication system having further higher reliability can be realized.

DESCRIPTION OF THE PREFERRED EMBODIMENT

Figure 2:
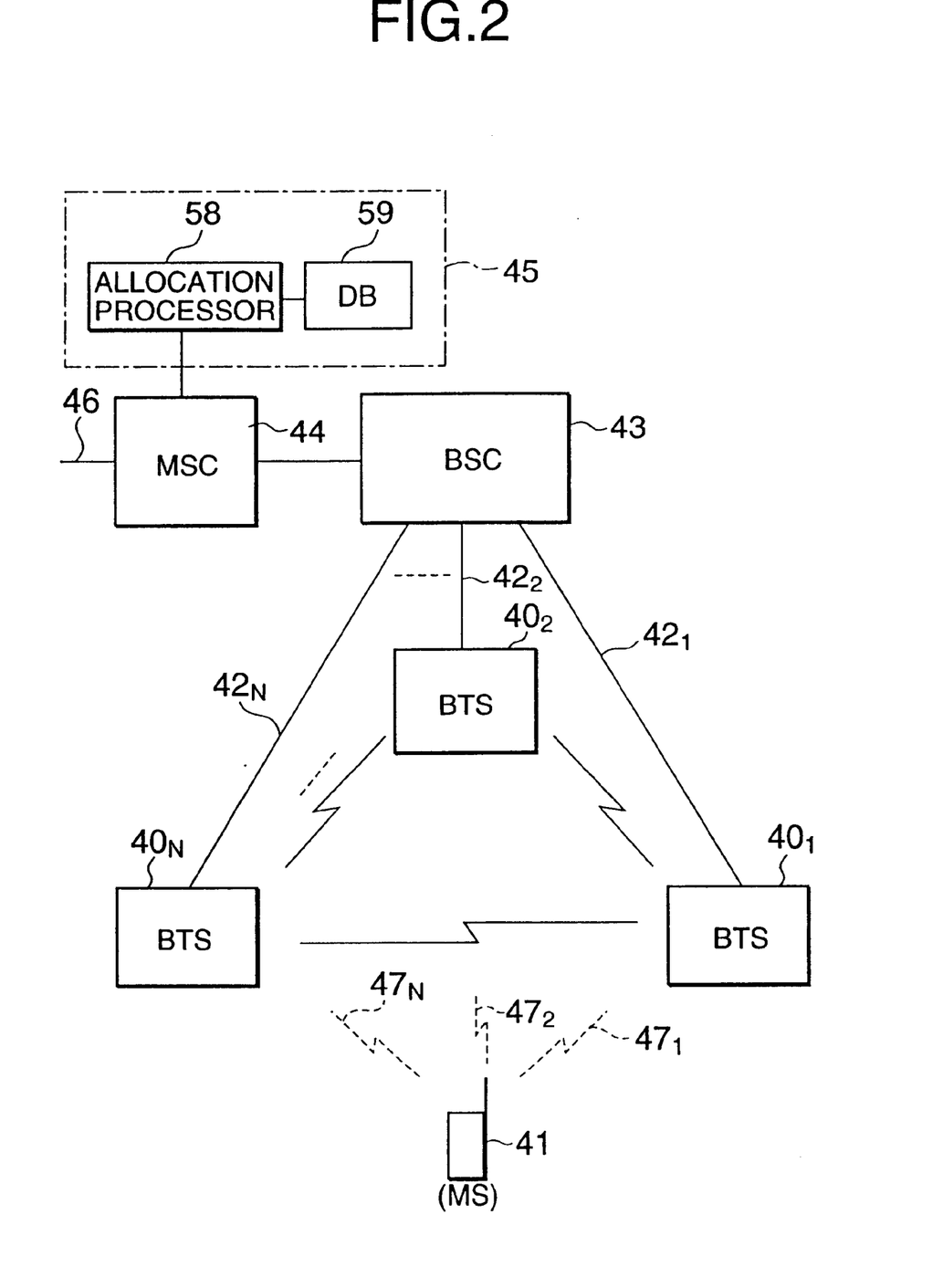
FIG. 2 is a schematic diagram showing the configuration of a mobile communications system employing a spreading code allocation system according to an embodiment of the present invention.

Referring to FIG. 2, assuming for simplicity that a mobile communications system includes a 1st through Nth base transceiver stations (BTSs) $40_1$ through $40_N$ each providing call processing service to mobile stations located within its service area using the CDMA scheme. A mobile station (MS) 41 can transmit and receive radio waves to and from the first through Nth BTSs $40_1$ through $40_N$. The first through Nth BTSs $40_1$ through $40_N$ are connected to a base transceiver station controller (BSC) 43 via transmission paths $42_1$ through $42_N$, respectively. The BSC 43 is connected to a mobile switching center (MSC) 44.

The MSC 44 has a code allocation section 45. The MSC 44 Is connected to a public network (not shown) via a public line 46. The MS 41 can communicate with the first through Nth BTSs $40_1$ through $40_N$ by radio signals $47_1$ through $47_N$, respectively. A radio signal may convey incoming call information to the MS 41, outgoing call information from the MS 41 to a terminal of the opposite party, or communication information.

Each of the first through Nth BTSs $40_1$ through $40_N$ has a unique PN code allocated thereto as a spreading code. The respective BTSs are notified of corresponding PN codes via the BSC 43 and the transmission paths $42_1$ through $42_N$.

The MSC 44 performs call processing between the terminal of the opposite party and the MS 41 managed by the MSC 44 The BSC 43 monitors the BTSs including one communicating with the MS 41 at any time and changes the BTS communicating with the MS 41 to an adjacent BTS depending on movement of the MS 41. When an incoming call addressed to the MS 41 has occurred, the MSC 44 conducts call processing for the BTS serving an area in which the MS 41 exists.

Each BTS periodically sends a pilot PN code of its own BTS, called "pilot channel", to MSs existing in the service area served by the BTS, and transmits information for synchronization acquisition and holding, and clock recovery in each MS. Each MS responds to a BTS sending a pilot channel which is the largest in received intensity. As a result, each BTS can determine whether an MS under search is present in its own service area or not, and notifies the BSC of its result.

For example, it is now assumed that an incoming call to the MS 41 existing in an area served by the Nth BTS $40_N$ has occurred. Since the MS 41 has been recognized to be located within the service area of the Nth BTS $40_N$ by responding to a pilot channel from the Nth BTS $40_N$, the MSC 44 conducts call setup processing with the MS 41 via the BSC 43 and the Nth BTS $40_N$. At this time, the MS 41 can recognize from the PN code of the Nth BTS $40_N$ received over the above pilot channel that the call setup is caused by the Nth BTS $40_N$. In other words, the MS 41 selects and receives only the radio wave from the Nth BTS $40_N$ without being affected by radio waves from the first through (N−1)th BTSs $40_1$ through $40_{N-1}$. If the MS 41 has moved into an area served by the third BTS $40_3$, then the movement is periodically monitored by the BSC 43 as a result of MS 41 responding to a pilot channel sent from each BTS. Thereafter, communicating with the MS 41 is performed via the third BTS $40_3$.

In the spreading code allocation system according to the present embodiment, a pilot channel including a known PN code is transmitted from a certain BTS to all BTSs in response to a command received from the code allocation section 45. Each BTS detects a shift of the transmitted PN code by referring to the pilot channel received from another BTS. The code allocation section 45 collects detected shifts of PN codes from the BTSs, respectively, and allocates optimum PN codes to the BTSs on the basis of the shifts of PN codes.

Figure 3:
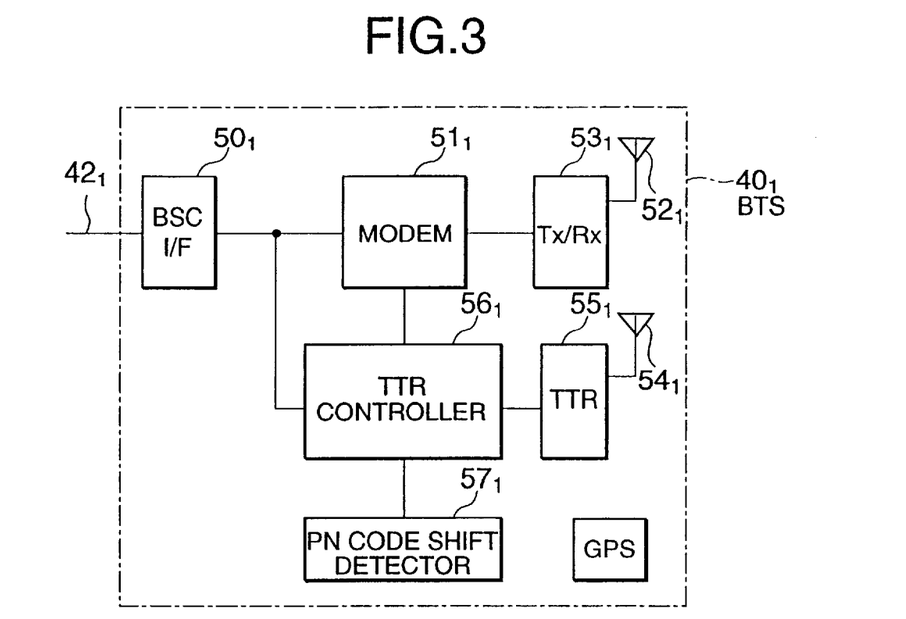
FIG. 3 is a block diagram showing the schematic circuit configuration of a base transceiver station (BTS) in the present embodiment.

Referring to FIG. 3, the configuration of a BTS will now be described, taking the first BTS $40_1$ as an example. It should be noted that the 1st through Nth BTSs $40_1$ through $40_N$ have the same circuit configuration but different only in allocated PN code.

The first BTS $40_1$ includes a BSC interface $50_1$ connected to the BSC 43 via the transmission path $42_1$, a modem $51_1$ for conducting radio modulation/demodulation and spread-spectrum modulation/demodulation, and a radio transceiver $53_1$ for conducting radio transmission and reception via an antenna $52_1$.

The radio transceiver $53_1$ receives a radio signal through the antenna $52_1$ and the modem $51_1$ performs radio demodulation of the received signal and then spread-spectrum demodulation using the PN code which has been allocated to the first BTS $40_1$. The demodulated signal is sent from the BSC interface $50_1$ to the BSC 43 via the transmission path $42_1$ and then to the MSC 44. Depending on the transmission form of the transmission path $42_1$, the BSC interface $50_1$ may conduct optoelectronic conversion and level conversion.

On the other hand, the BSC interface $50_1$ converts transmission data received from the MSC 44 via the transmission path $42_1$ and the BSC 43 into an intra-system level. The converted transmission data is subjected to radio modulation and spread-spectrum modulation in the modem $51_1$ using the PN code previously allocated to the first BTS $40_1$. The transmission data thus subjected to modulation is sent out from the radio transceiver $53_1$ via the antenna $52_1$.

The first BTS $40_1$ is further provided with an antenna $54_1$ a test transceiver (hereafter abbreviated to TTR) $55_1$ a TTR controller $56_1$, and a PN code shift detector $57_1$. The TTR $55_1$ has an antenna $54_1$ connected thereto and has the substantially same function as the MS 41. The TTR controller $56_1$ controls the TTR $55_1$ and is controlled depending on various control signals received from the MSC 44 via the BSC 43 and the transmission path $42_1$. The TTR $55_1$ is used to transmit and receive a radio test signal to and from the radio transceiver $53_1$ to check whether the radio communication function normally operates. It is determined whether the TTR $55_1$ should conduct this test or not depending on a command given from a manager (not shown) which is connected to the MSC 44 or BSC 43.

In addition, according to the present embodiment, each BTS is provided with a PN code shift detector $57_1$. More specifically, each BTS transmits a pilot channel including a known PN code to the other BTSs under control of the code allocation section 45. When receiving such a pilot channel from another BTS at the TTR $55_1$, the TTR controller $56_1$ outputs the received PN code conveyed on the pilot channel to the PN code shift detector $57_1$. The PN code shift detector $57_1$ detects a shift of the received PN code as described hereinafter.

In a mobile communication system, standard time called UTC (Universal Coordinated Time) common to the entire system is provided by, for example, the global positioning system (GPS). Therefore, each of the BTSs is provided with a GPS receiver The PN code shift detector $57_1$ detects a PN code shift in units of a chip based on a difference from when the PN code is sent on the transmission side to when it is received on the reception side.

Here, assuming that a chip is defined as 1/(spreading chip rate), a PN code has a correlation length of 64 chips, and further that a known PN code transmitted from a certain BTS is PN#1. If a shift of the PN code received and calculated by another BTS is 100 chips it follows that: "1+100/64=2+ remainder" because of one PN code consisting of 64 chips. If every "remainder" is rounded up to a whole number, the amount of a shift, "3", is obtained by the PN code shift detector $57_1$. The shift of the PN code thus detected by the PN code shift detector: $57_1$ is reported to the code allocation section 45 via the BSC interface $50_1$ and the transmission path $42_1$.

Although a conventional BTS also detects the shift of the PN code, it is used to determine a distance between a MS and a BTS. In the case where an MS exceeds a distance predetermined as the range of a service area, the call processing and monitoring operations are no longer done, and the capacity corresponding to the amount of reduction in processing is used for other processing. However, the present embodiment has a feature that the PN code shift detection is used to determine a distance between BTSs.

The code allocation section 45 includes an allocation processor 58 and a database 59 as shown In FIG. 2. The allocation processor 58 instructs each of BTSs to detect the PN code shift and collects detection results from the BTSs. The database 59 retrievably stores the collected detection results. More specifically, under control of the allocation processor 58, each BTS turns on BTS transmission and transmits a pilot channel having the known PN code allocated thereto. Each BTS which has received them from other BTSs reports the detected shift for each of received pilot channels to the code allocation section 45. After that reporting, the allocation processor 58 turns off the BTS transmission.

Figure 4:
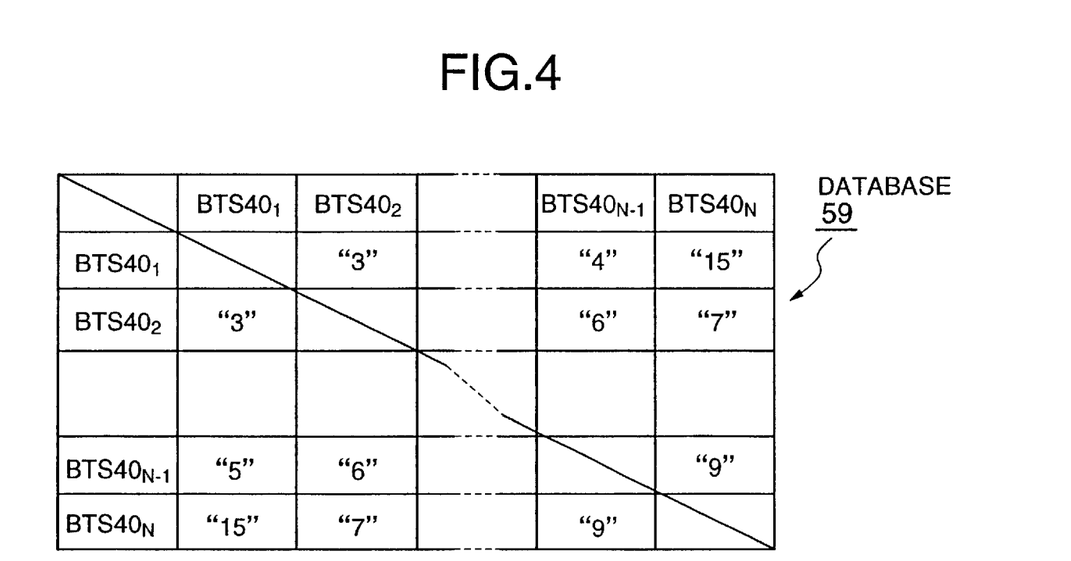
FIG. 4 is a diagram showing an example of the contents of a database in the present embodiment.

As shown in FIG. 4, the database 59 stores a table containing the detected PN code shifts which were detected by each BTS using pilot channels received from other BTSs under control of the allocation processor 58. Taking the second the BTS $40_2$ as an example, the PN code shift detector $57_2$ of the second BTS $40_2$ detects the PTN code shift "3" from the pilot channel received from the first BTS $40_1$. In the same way, the second BTS $40_2$ detects the PN code shift "6" from the pilot channel received from the (N−1)th BTS $40_{N-1}$ and detects "7" from the pilot channel received from the Nth BTS $40_N$. Taking the (N−1)th BTS $40_{N-1}$ as another example, the PN code shift detector $57_2$ of the (N−1)th BTS $40_{N-1}$ detects the PN code shift "5" from the pilot channel received from the first BTS $40_1$, the PN code shift "6" from the pilot channel received from the second BTS $40_2$ and detects the PN code shift "9" from the pilot channel received from the Nth BTS $40_N$.

Ideally, a PN code shift from a BTS $40_I$ to a BTS $40_J$ is the same as a PN code shift from the BTS $40_J$ to the BTS $40_I$. In some cases, however, they do not coincide with each other because of influence of geographic features and natural terrains upon the path. In FIG. 4, a shift from the first BTS $40_1$ to the (N−1)th BTS $40_{N-1}$ is different in magnitude from that from the (N−1)th BTS $40_{N-I}$ to the first BTS $40_1$.

Figure 5:
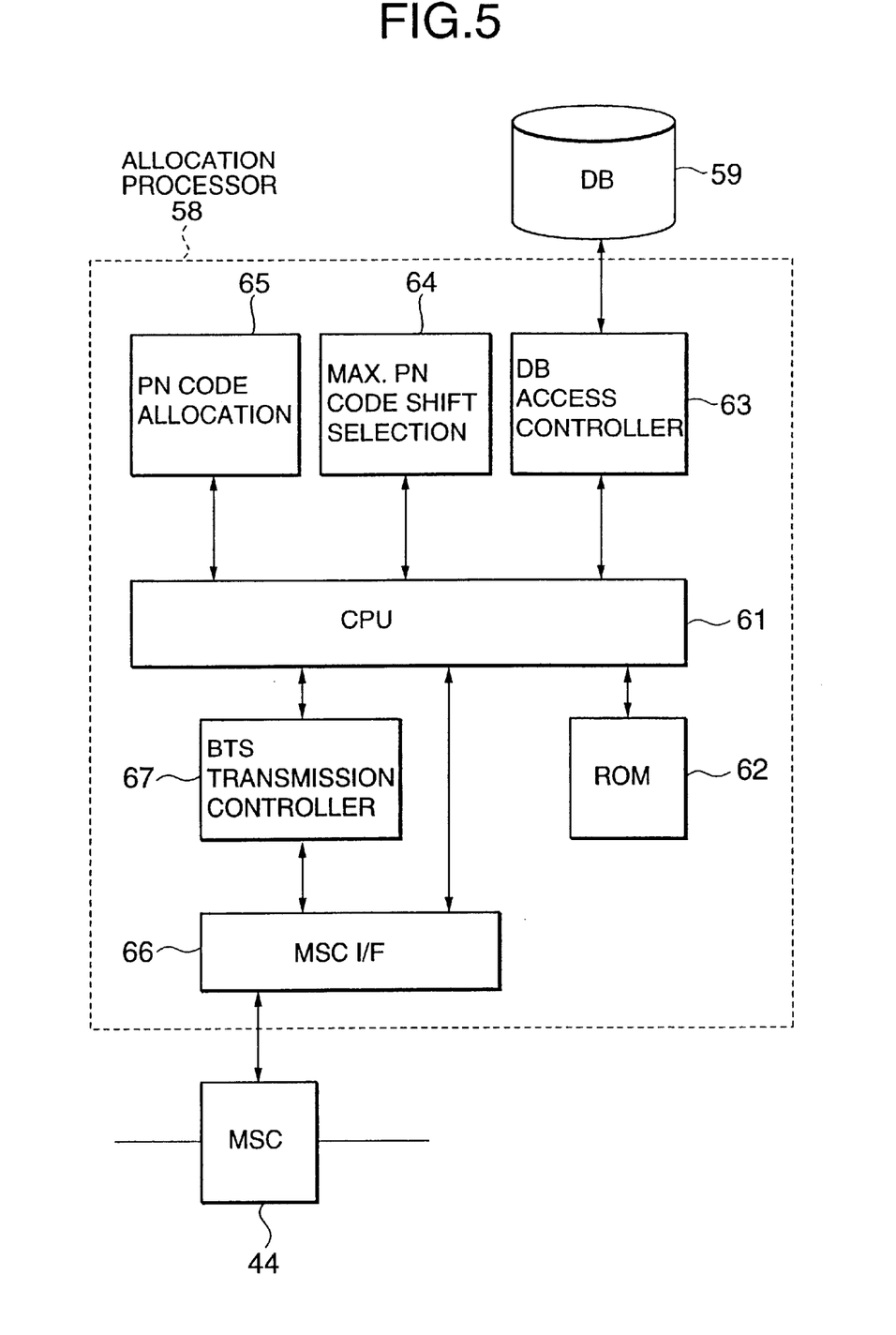
FIG. 5 is a block diagram showing the schematic circuit configuration of an allocation processor in the present embodiment.

Referring to FIG. 5, the allocation processor 58 includes a central processing unit (CPU) 61 on which control programs including a code allocation program will run. Such control programs are stored in read-only memory (ROM) 62. The CPU 61 can write and read data to and from the database 50 through a database access controller 63.

The CPU 61 uses a maximum PN code shift selector 64 and a PN code allocation section 65 to set code distances between spreading codes to be allocated to BTSs referring to the table stored in the database 59. According to the set code allocation, the selected spreading codes are sequentially allocated to the BTSs through an MSC interface 66. A BTS transmission controller 67 performs a pilot channel transmission instruction to each BTS and collection of PN code shift detection results.

As described above, the allocation processor 58 causes each BTS to transmit a pilot channel having a known PN code allocated thereto, collects PN code shifts detected by each BTS, and store them onto the database 59. On the basis of the information stored in the database 59, it is possible to achieve the optimum PN code allocation.

Figure 6:
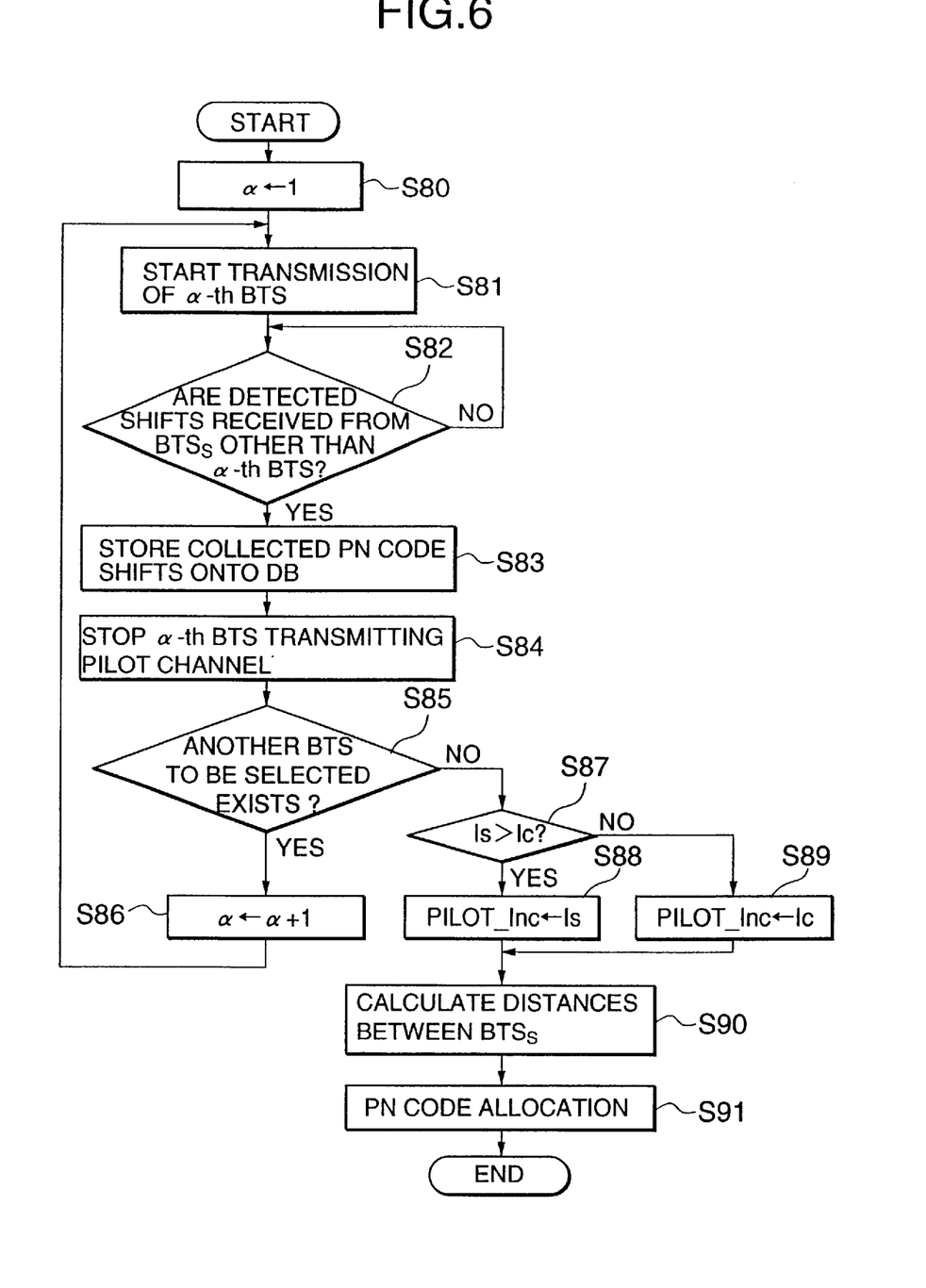
FIG. 6 is a flow chart showing a control operation of the allocation processor of FIG. 5.

Referring to FIG. 6, assuming that a BTS is represented by reference numeral $40_\alpha$ where α is an integer greater than zero, upon start of spreading code allocation processing, the variable α is set to 1 to specify the first BTS $40_1$ (step S80).

Thereafter, the allocation processor 58 starts transmission operation of the BTS $40_\alpha$ to transmit a pilot channel with its allocated PN code (step S81). As described before each of the BTSs other than the BTS $40_\alpha$ receives the a pilot channel from the BTS $40_\alpha$, and then detects the PN code shift in units of a chip. The allocation processor 58 determines whether a detected shift has been received from all the BTSs other than the BTS $40_\alpha$ (step S82). When having received from all the BTSs other than the BTS $40_\alpha$ (YES in step S82), the collected PN code shifts for the selected BTS $40_\alpha$ are stored onto the predetermined storage locations of the database 59 (step S83) and the BTS $40_\alpha$ is instructed to stop the transmission of the pilot channel (step S84).

When having completed the pilot channel transmission of the selected BTS $40_\alpha$, it is checked whether all the BTSs have been selected (step S85). If not, the variable α is incremented (step S86) and the control goes back to the step S81. In this way, the steps S81–S86 for PN code shift collection are repeatedly performed while sequentially selecting the BTSs until all the BTSs have been selected (NO in step S85).

When PN code shifts for all of the BTSs have been collected (NO in step S85) the maximum PN code shift selector 64 selects a maximum value (hereafter referred to as Ic) of PN code shifts stored in the database 59. Assuming that each PN code has a length of M bits and one PN code has 64 chips, a PN code can have any of $2^M/64$ possible values. Hereinafter, assuming M=15, a PN code can be set to any of 512 (i.e., $2^{15}/64$) possible values. Further when the number of installed BTSs is Ns, 512/Ns (hereafter referred to as Is) is a spacing of PN codes in this case.

The allocation processor 58 determines whether the PN code spacing Is is greater than the maximum PN code shift Ic (step S87). If Is is greater than Ic (YES in step S87), Pilot_inc is set to the value of Is (step S88). On the other hand, if Is is equal to or less than Ic (NO in step S67), the Pilot_inc is set to the value of Ic (step S89). This Pilot_inc becomes a parameter used when the MS searches PN codes.

In other words, in the case where Is is greater than Ic, the number of installed BTSs is small and 512 possible PN codes can be allocated to all base transceiver stations with sufficient code spacing. By allocating PN codes with greater code spacing, the possibility of erroneous detection of a PN code between adjacent base transceiver stations is dramatically reduced. As a result, the reliability of communication in the system as a whole can be increased. On the other hand, if the number of installed base transceiver stations becomes great, the selected Ic is used as the PN code spacing among the base transceiver stations.

Subsequently, distances between BTSs are calculated using the PN code shifts stored in the database 59 (step S90). In the case where a chip frequency f is 1.2288 MHz, the distance per chip is approximately 244.14 m which is calculated by the relation represented as "c (light velocity)/ $f=3\times10^8/1.2288\times10^6$". Therefore, a distance between BTSs can be calculated by multiplying each PN code shift between the BTSs by 244.14 m.

As for a distance between BTSs which cannot be calculated because of nonarrival of a radio wave such as in the case where a pilot channel cannot be received from a certain BTS, a physical distance is used. In practice the reception sensitivity is greatly influenced by a communication environment such as geographic features. Only the physical distance cannot provide an optimum reception sensitivity. However, only when distance calculation cannot be made, a corresponding physical distance is used.

Further, each BTS has a GPS receiver therein in order to obtain the standard time for synchronization of the whole system. Therefore, it is possible to calculate a distance between BTSs using the latitude and longitude of the installation place which are transmitted from the GPS receiver to the allocation processor 58. Alternatively, by storing the latitude and longitude of the installation place of each BTS in the database 59 in advance, it Is also possible to obtain a distance between BTSs which cannot be calculated because the corresponding PN code shift has not been received.

When distances between BTSs have been calculated, the PN code allocation section 65 performs PN code allocation (step S91). First of all, an arbitrary PN code is allocated to one BTS. Thereafter, a PN code having a spacing of the Pilot_inc from the previously allocated PN code is allocated to a BTS having the longest calculated distance from the previously selected BTS. By repeating such a step, PN codes having equal spacing of Pilot_inc are allocated to all BTSs. The details will be described, taking as an example the case where the PN code #1 is allocated to the first BTS at first.

Figure 7:
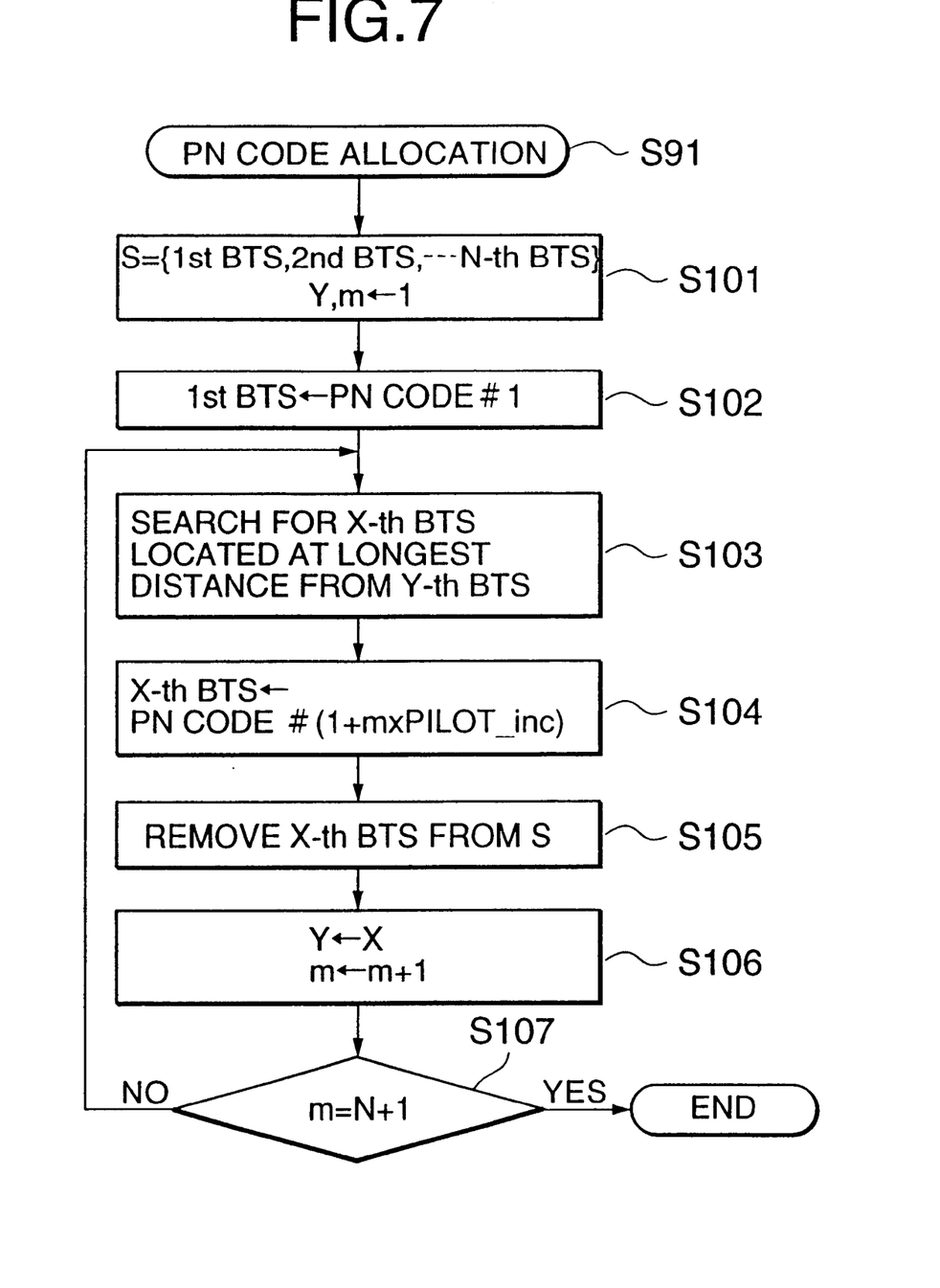
FIG. 7 is a flow chart to assist in further defining the invention.

Referring to FIG. 7, assuming that a set S=(1st BTS, 2nd BTS, 3rd BTS, . . . , N-th BTS) from which a BTS located at the longest distance from the previously selected BTS is selected.

After variables Y and m are initially set to 1 (step S101) the PN code #1 is allocated to the 1st BTS (step S102). Thereafter, the CPU 61 searches the database 59 for a BTS located at the longest distance from Y-th BTS. If X-th BTS is such a BTS located at the longest distance from Y-th BTS, a PN code #(1+m×Pilot_inc) is allocated to the X-th BTS (step S104). The PN code #(1+m×Pilot_inc) is a PN code with a spacing of (m×Pilot_inc) from the PN code #1.

Subsequently, the X-th BTS is removed from the set S (step S105) and then the variable Y is set to the value of X and the variable m is incremented (step S106). The steps S103–S106 are repeatedly performed until the variable m reaches N+1 (step S107).

Assuming that the BTS located at the longest distance from the first BTS $40_1$ is the third BTS $40_3$ (step S103), a PN code #(1+Pilot_inc) is allocated to the third BTS $40_3$ (step S104). Subsequently, if the BTS located at the longest distance from the third BTS $40_3$ is the N-th BTS $40_N$ (step S103), then code (1+2×Pilot_inc) is allocated to the N-th BTS $40_N$. When PN codes having equal spacing of Pilot_inc are thus allocated to all the BTSs, the PN code allocation processing is finished (YES in step S107).

By allocating PN codes having equal spacing of Pilot_inc to BTSs located at the longest distance for each step S103, a PN code having a large spacing as far as possible from the PN of its own BTS can be allocated to a nearby BTS. Thus the possibility of erroneous detection of PN codes can be further decreased, resulting in improved communication quality.

As described above, in the spreading code allocation system of the present embodiment, each BTS transmits a pilot channel including a known PN code to other BTSs. Shift values of received PN codes for each BTS are reported to the allocation processor and are stored onto the database 59 in a table form. On the basis of shift values of PN codes among BTSs, a maximum shift value (Ic) and a PN code spacing Is are determined by the maximum PN code shift selector 64. A greater one of Ic and Is is selected as Pilot_Inc representing a spacing of allocated PN codes. Furthermore, on the basis of shift values of PN codes among BTSs, distances among BTSs are calculated. First of all, an arbitrary PN code is allocated to one BTS. Thereafter, a PN code having a spacing of the Pilot_inc from the previously allocated PN code is allocated to a BTS having the longest calculated distance from the previously selected BTS. In this way, PN codes having equal spacing of Pilot_inc are allocated to all BTSs.

In the present embodiment, the transmission paths $42_1$ through $42_N$ of control signals for code allocation transmitted from the code allocation section 45 are not limited to their transmission form.

Furthere, in an alternative implementation, each BTS receives a pilot channel from other BTSs, and both the known PN code included in the pilot channel and the time lag of the received PN code are reported to the code allocation section 45. The code allocation section 45 may calculate the shift value from the PN code. Furthermore, the code allocation section 45 may be connected to the BSC 43.

What is claimed is:

1. A method for allocating a plurality of spreading codes to a plurality of base stations, comprising:
    a) retrievably storing distances between each of the base stations and other base stations in a memory;
    b) searching the memory for a longest distance of the distances;
    c) determining a spreading code spacing between spreading codes to be allocated to the base stations based on a necessary spreading code difference and a longest spreading code shift corresponding to the longest distance; and
    d) sequentially allocating spreading codes with the spreading code spacing to the base stations.

2. A method according to claim 1, wherein the step c) comprises:
    c-1) comparing the necessary spreading code difference with the longest spreading code shift; and
    c-2) selecting a greater one of the necessary spreading code difference and the longest spreading code shift as the spreading code spacing.

3. A method according to claim 1, wherein the necessary spreading code difference is obtained by dividing a number of available spreading codes by a number of the base stations.

4. A method according to claim 1, wherein in the step d), the spreading codes with the spreading code spacing are allocated to the base stations such that two spreading codes with a smaller spacing are allocated respectively to two base stations which are located at a longer distant from each other.

5. A method according to claim 4, wherein the step d) comprises:
    d-1) selecting a certain base station and a certain spreading code which is allocated to the certain base station;
    d-2) selecting a base station located at a longest distance from a previously selected base station, excepting a further previously selected base station;
    d-3) allocating a spreading code to a currently selected base station, wherein a currently allocated spreading code is shifted from a previously allocated spreading code by the spreading code spacing; and
    d-4) repeating the steps d-2) and d-3) until the spreading codes have been allocated to all the base stations.

6. A method for allocating a plurality of spreading codes to a plurality of base stations in a mobile communications system, comprising:
    at each of the base stations,
    a) transmitting a predetermined spreading code on a pilot channel to other base stations;
    b) detecting a spreading code shift from the predetermined spreading code received from each of the other base stations;
    c) transmitting the spreading code shift to a controller of the mobile communications system;
    at the controller,
    d) retrievably storing spreading code shifts received from the base stations in a memory;
    e) searching the memory for a longest spreading code shift;
    f) determining a spreading code spacing between spreading codes to be allocated to the base stations based on a necessary spreading code difference and the longest spreading code shift; and
    g) sequentially allocating spreading codes with the spreading code spacing to the base stations.

7. A method according to claim 6, wherein the step f) comprises:
    f-1) comparing the necessary spreading code difference with the longest spreading code shift; and
    f-2) selecting a greater one of the necessary spreading code difference and the longest spreading code shift as the spreading code spacing.

8. A method according to claim 6, wherein the necessary spreading code difference is obtained by dividing a number of available spreading codes by a number of the base stations.

9. A method according to claim 6, wherein in the step g), the spreading codes with the spreading code spacing are allocated to the base stations such that two spreading codes with a smaller spacing are allocated respectively to two base stations which are located at a longer distant from each other.

10. A method according to claim 9, wherein the step g) comprises:
    g-1) calculating distances between each of the base stations and other base stations from the spreading code shifts stored in the memory;
    g-2) selecting a certain base station and a certain spreading code which is allocated to the certain base station;
    g-3) selecting a base station located at a longest distance from a previously selected base station, excepting a further previously selected base station;
    g-4) allocating a spreading code to a currently selected base station, wherein a currently allocated spreading code is shifted from a previously allocated spreading code by the spreading code spacing; and
    g-5) repeating the steps g-3) and g-4) until the spreading codes have been allocated to all the base stations.

11. A system for allocating a plurality of spreading codes to a plurality of base stations which are connected to a system controller,
    each of the base stations comprising:
        a test transceiver for transmitting and receiving a predetermined spreading code on a pilot channel to and from other base stations under control of the system controller;
        a detector for detecting a spreading code shift from the predetermined spreading code received from each of the other base stations; and
        a transmitter for transmitting the spreading code shift to the system controller, and
    the system controller comprising:
        a database for retrievably storing spreading code shifts received from the base stations;

a selector for searching the database for a longest spreading code shift; and an allocation controller for determining a spreading code spacing between spreading codes to be allocated to the base stations based on a necessary spreading code difference and the longest spreading code shift, and for sequentially allocating spreading codes with the spreading code spacing to the base stations.

12. A system according to claim 11, wherein the allocation controller comprises:

a comparator for comparing the necessary spreading code difference with the longest spreading code shift; and a selector for selecting a greater one of the necessary spreading code difference and the longest spreading code shift as the spreading code spacing.

13. A system according to claim 11, wherein the necessary spreading code difference is obtained by dividing a number of available spreading codes by a number of the base stations.

14. A system according to claim 11, wherein the allocation controller allocates the spreading codes with the spreading code spacing to the base stations such that two spreading codes with a smaller spacing are allocated respectively to two base stations which are located at a longer distant from each other.

15. A system according to claim 14, wherein the allocation controller performs spreading code allocation according to a program comprising the steps of:

a) calculating distances between each of the base stations and other base stations from the spreading code shifts stored in the memory;

b) selecting a certain base station and a certain spreading code which is allocated to the certain base station:

c) selecting a base station located at a longest distance from a previously selected base station, excepting a further previously selected base station;

d) allocating a spreading code to a currently selected base station, wherein a currently allocated spreading code is shifted from a previously allocated spreading code by the spreading code spacing; and e) repeating the steps c) and d) until the spreading codes have been allocated to all the base stations.

* * * * *